United States Patent
Ryan

(10) Patent No.: US 7,584,571 B2
(45) Date of Patent: Sep. 8, 2009

(54) ONE PIECE POLYGONAL CARBON FIBER ROD WITH INTEGRAL SPINE

(76) Inventor: Eric Thomas Ryan, Ryan Rod Company, 100 Fowler La., Roseville, CA (US) 95678

( * ) Notice: Subject to any disclaimer, the term of this patent is extended or adjusted under 35 U.S.C. 154(b) by 0 days.

(21) Appl. No.: 11/065,981

(22) Filed: Feb. 24, 2005

(65) Prior Publication Data

US 2005/0193617 A1 Sep. 8, 2005

Related U.S. Application Data

(60) Provisional application No. 60/550,646, filed on Mar. 5, 2004.

(51) Int. Cl.
*A01K 87/00* (2006.01)
(52) U.S. Cl. .................. 43/18.1 CT; 43/18.5
(58) Field of Classification Search ............. 43/18.1 R, 43/18.5, 18.1 CT; D22/139, 142
See application file for complete search history.

(56) References Cited

U.S. PATENT DOCUMENTS

| 592,613 | A | * | 10/1897 | Kenyon | ................... | 43/18.1 R |
|---|---|---|---|---|---|---|
| 638,733 | A | * | 12/1899 | Martin | ................... | 43/18.1 R |
| 1,293,208 | A | | 2/1919 | Ryan | | |
| 1,318,421 | A | * | 10/1919 | Welles | ................... | 43/18.1 R |
| 1,748,223 | A | * | 2/1930 | Herris | ................... | 43/18.1 R |
| 1,811,419 | A | * | 6/1931 | Anderson | ................. | 43/18.1 R |
| 1,880,348 | A | * | 10/1932 | Lane | ........................ | 43/18.1 R |
| 1,931,303 | A | * | 10/1933 | Sturgis | ......................... | 43/23 |
| 1,932,986 | A | * | 10/1933 | Powell | ................... | 43/18.1 R |
| 2,364,849 | A | * | 12/1944 | Ibbotson et al. | ............. | 144/346 |
| 2,537,488 | A | * | 1/1951 | Stoner | ................... | 43/18.1 R |
| 2,600,629 | A | * | 6/1952 | Feierabend | ................. | 403/305 |
| 4,083,140 | A | * | 4/1978 | Van Auken et al. | .......... | 43/18.5 |
| 4,362,418 | A | * | 12/1982 | Loomis | ..................... | 403/334 |
| 4,468,270 | A | * | 8/1984 | Green | ........................ | 156/189 |
| 4,582,758 | A | * | 4/1986 | Bruce et al. | .................. | 428/397 |
| 4,962,608 | A | * | 10/1990 | Loomis et al. | ........... | 43/18.1 R |
| 5,229,187 | A | * | 7/1993 | McGinn | ..................... | 428/188 |
| 6,277,473 | B1 | * | 8/2001 | McGinn | ..................... | 428/188 |
| 6,581,352 | B1 | | 6/2003 | Amirsoleyman | | |
| 6,601,334 | B1 | * | 8/2003 | Ono et al. | ................ | 43/18.1 R |
| 2002/0092225 | A1 | | 7/2002 | Watanabe | | |

* cited by examiner

*Primary Examiner*—Kurt Rowan
(74) *Attorney, Agent, or Firm*—Rodger Rast; Rastar Corp.

(57) ABSTRACT

A composite fishing rod is described having a polygonal exterior with an integral interior spine which attaches to the interior of the joints or facets of the polygonal exterior. The polygonal exterior and spine are formed in one homogeneous structure, wherein gluing or other attachment is not required after forming the rod section. The fishing rod provides a high strength to weight ratio with improved flexibility, durability and action when compared with rods of conventional construction. The invention describes alternative embodiments for fabrication and novel joining ferrules, reel seat, line guide and other accessories directed toward enhanced utility.

18 Claims, 15 Drawing Sheets

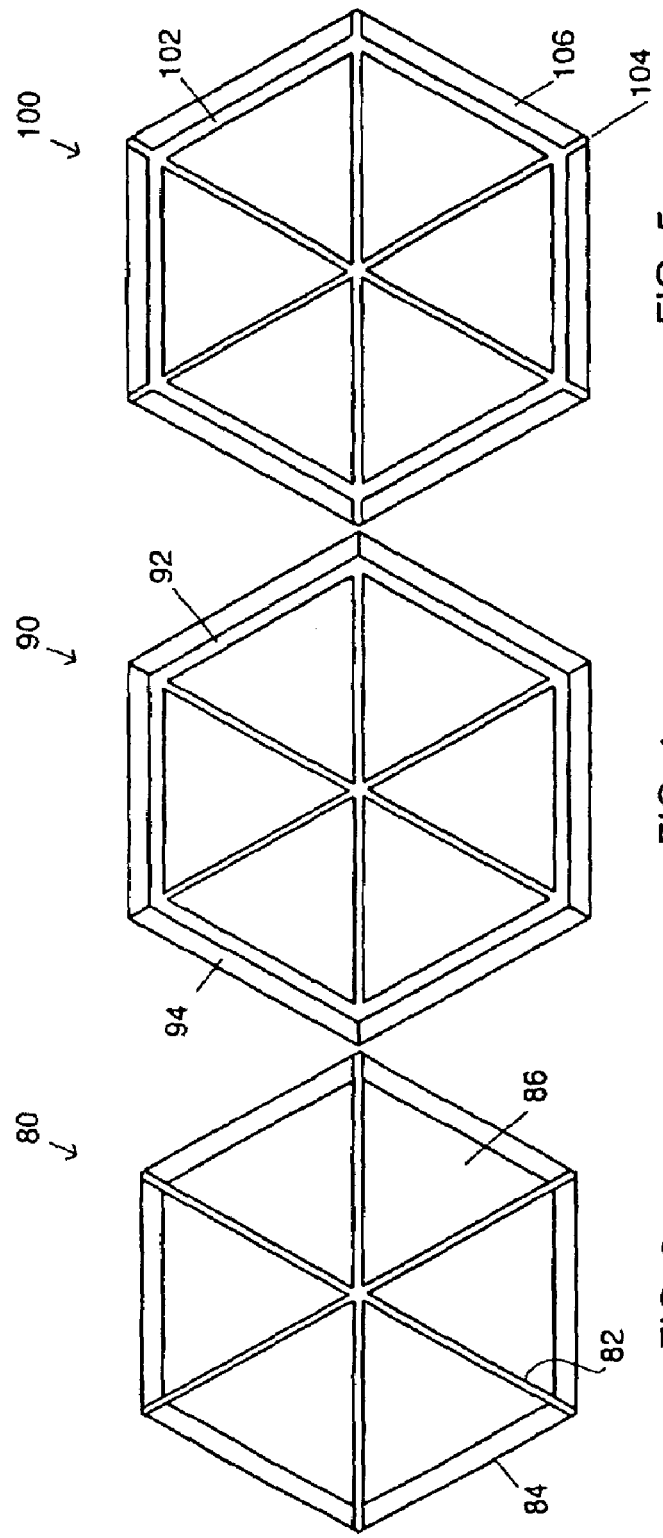

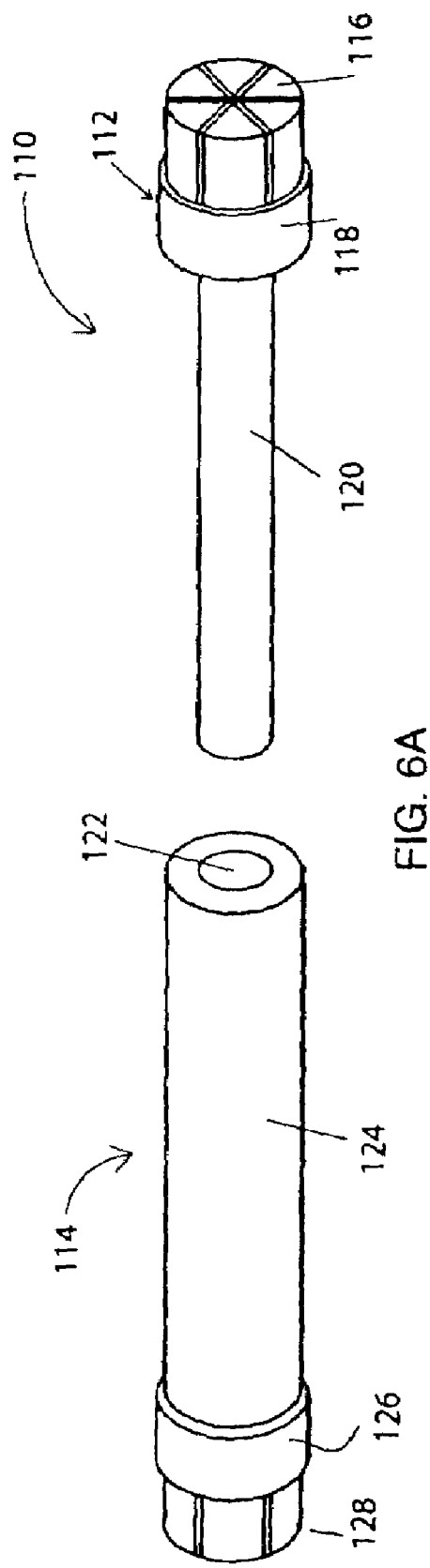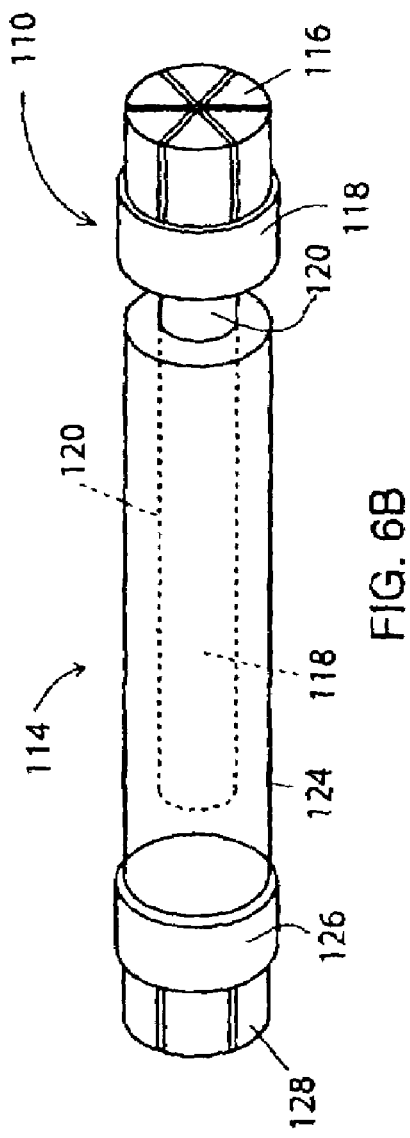
FIG. 6A
FIG. 6B

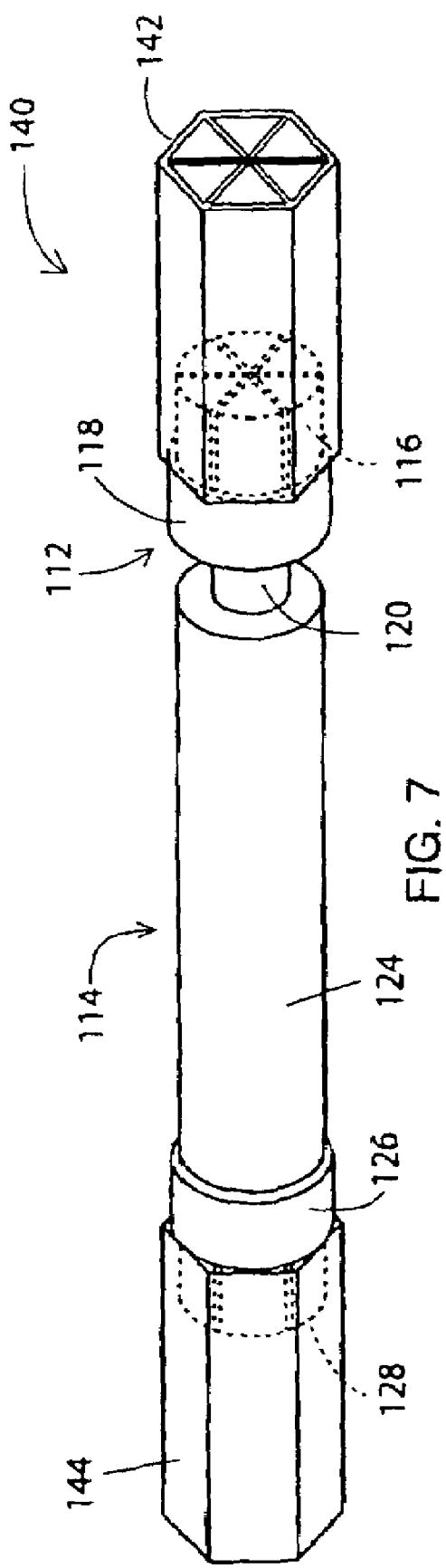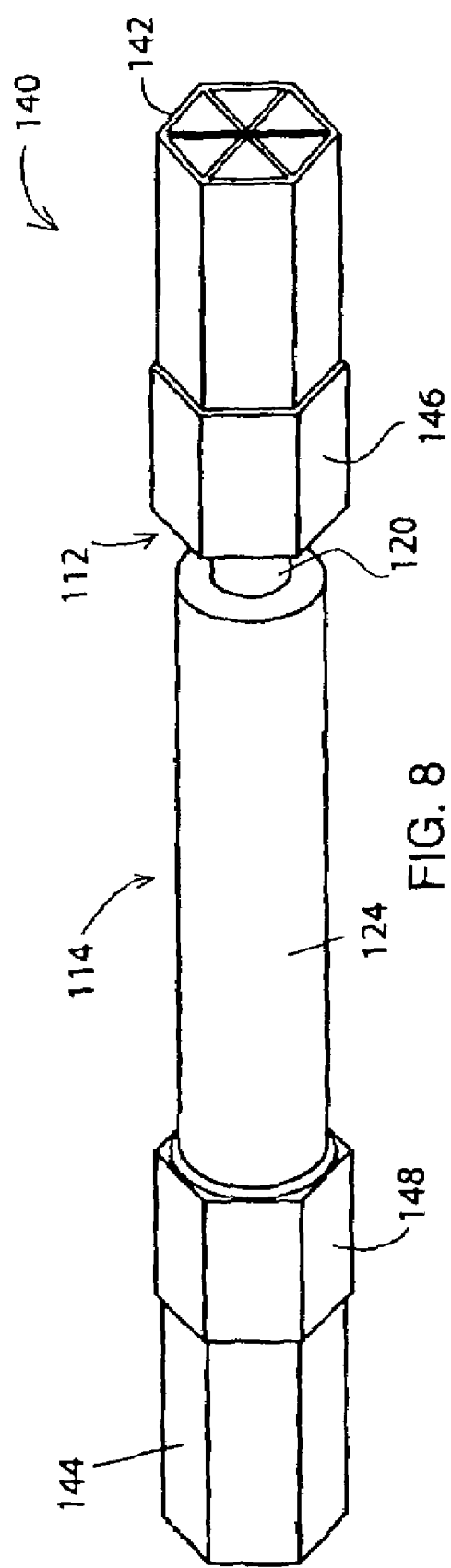

ONE PIECE POLYGONAL CARBON FIBER ROD WITH INTEGRAL SPINE

CROSS-REFERENCE TO RELATED APPLICATIONS

This application claims priority from provisional patent application Ser. No. 60/550,646 filed Mar. 5, 2004, provisional patent application Ser. No. 60/503,407 filed Sep. 15, 2003 (now expired) and provisional patent application Ser. No. 60/484,743 filed Jul. 3, 2003 (now expired).

STATEMENT OF FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to fishing rods and more particularly to a fishing rod having a polygonal cross section with integral spine which is molded in a single piece.

2. Description of the Background Art

The market for fishing rods manufactured from high tensile-strength materials, such as glass or carbon fiber, has been increased readily in recent years as the material provides a high strength to weight ratio. The most traditional fishing rods are manufactured having a circular cross-section and are generally formed in two pieces that interconnect at a ferrule. However, the circular cross section lack strength and is prone to shear and buckling under a sufficient stress.

One major disadvantage of the circular cross section is that for any given stress the top-most and bottom-most fiber in the cross section see the greatest strain to failure. If the rod is bent down, the top fiber on the circular cross section has the greatest tension; while the very bottom fiber in the circular cross section has the greatest compression. These stresses lead to premature failure. Another disadvantage to the circular cross section is that the greater the amount of stress in any direction, the greater the circular cross section tends to deform into an oval until the circular cross section collapses entirely. To counteract the deformation of the circular cross section, a redundancy of material is required, typically comprising "hoop" material used in bias with the longitudinal fibers. These hoop fibers do nothing for the action of the rod, and actually detract form the potential dynamic action of a circular cross section rod with only linear fibers. Moreover, these bias or hoop fibers promote shearing of the cross section, for when the top fiber breaks or the bottom fiber compresses, shear stress follows the bias fibers, and more readily leads to catastrophic shear failure. In addition, a serious angler is unable to obtain the proper action and level of flex across the length of the rod using a circular cross section. Accuracy is also at issue with the use of circular rod sections.

During the manufacturing of the circular cross section rod, a triangular pattern of material is wrapped around a tapered circular mandrel. This triangular lay-up method, always creates a seam on the inside and outside of the rod. Now the inside seam may run linearly down the mandrel, but the outside seam always spirals around the laid-up blank. The interior seam causes an uneven amount of fibers on one side of the blank. These uneven fibers give the finished circular rod section a linearly stiff area in the symmetrical action of the rod. The exterior seam is usually sanded or ground away; however, as the exterior laminate seam spirals around the finished blank, these uneven fibers give the finished circular rod section an asymmetric rotational action. The combination of the interior and exterior seams create what is known to serious rod makers as a spline. A rod with a spline does not have symmetrical action, and is therefore a detriment to serious accuracy. Another disadvantage of the circular cross section rod is its aerodynamics. It is common knowledge in the field of aerodynamics, that the circular rod creates more drag than any other symmetrical cross section. One major advantage of the circular rod is that these rods are readily laid-up during a simple manufacturing process. The simplicity of manufacturing of the circular cross section rod guarantees that it will always have some place in the fishing rod market, despite its relative lack of performance.

In the field of sport fishing, the rods which perhaps are subject to the highest level of scrutiny by anglers are fly fishing rods. Any fly fisherman, especially after hours of casting, recognizes the supreme importance of having very light weight equipment which provides exactly the right flexure along its entire length while not being subject to discontinuity even at the ferrules. This applies to both fresh water fly fishing and salt water fly fishing, although the relative weights of the rods significantly differ. It is also important that fly rods can be subjected to widely varying loads and environmental conditions without losing their structural integrity. Serious fly fishermen eschew the use of the cheaply designed fly rods which are manufactured with a round cross section, as it is well known that these rods cannot provide optimum feel and flex while assuring sufficient strength.

Popular fly fishing rods for serious anglers have traditionally been manufactured from bamboo sections that are joined to form a fly rod with a hexagonal cross-section. These rods have been the standard for proper feel for a number of years. Although bamboo fly rods have provided a number of advantages for serious anglers over many years, they suffer from numerous disadvantages. One major disadvantage is the weight, as the rods must be of sufficient cross section area to prevent breakage. It should be realized that forming the rods from solid pieces of bamboo does not yield an optimum strength for the material, however, the low strength of the material generally precludes anything but solid construction. The strength problem is further exacerbated in that bamboo is a natural material which is subject to variation within a single piece of wood and from one piece to another. Other disadvantages of the material is that it is a natural material that must be protected from the elements, and is subject to damage from moisture, ultraviolet light, insects, and rough conditions. Another significant aspect which is often overlooked is that the bamboo rods are formed from separate pieces of bamboo that are glued together in forming the rod section. With these glued-up sections problems arise with material property differences between the glue and bamboo, possibilities of separation of the sections especially under load bearing conditions, as well as the difficulty of creating a fly fishing rod with the proper flexure characteristics.

The advantages of the hexagonal construction have been known to anglers other than just fly fishermen. Fishing rods have been made for a range of fishing needs, from light tackle fresh water fishing to heavy tackle salt water fishing, which utilize the bamboo construction techniques and hexagonal cross sections. In recent years a few manufacturers have experimented with making synthetic bamboo rods. One example is in the area of deep sea fishing rods. The construction of these rods is typically very similar to that of the bamboo, wherein triangular composite sections are laid-up and then glued together to form the hexagonal cross-section characteristic of bamboo rods. In another construction technique a group of "T-shaped" composite sections are laid-up and then the finished sections are glued together to form a hexagon. All of these rods suffer from the bulk of disadvantages common to bamboo rods, while they cannot be readily manufactured in the small cross sections necessary to compete in the fly rod fishing market. Another example used as a fly rod, is constructed with a laminate of carbon fiber bonded to a structural foam. Tapered triangles are machined from this laminate and bonded together in a similar technique as the split cane bamboo rod. Composing a rod with a carbon fiber shell around a foam core. These have certain theoretical advantages over the circular cross section rod; however, they are solid and heavy in comparison. They also fatigue at the glue seams, and since the only structure stopping the collapse of the cross section is structural foam, they have proven to soften and deaden in action over time with repeated use.

Accordingly a need exists for a fishing rod having a high strength to weight ratio which provides a desired flex profile and feel in addition to high durability. The fishing rod of the present invention fulfills those needs as well as others and overcomes the disadvantages inherent in the traditional construction and current composite structures.

BRIEF SUMMARY OF THE INVENTION

The present invention is a composite light-weight fishing rod which can be manufactured with nearly optimum flex and feel while providing desirable levels of strength and accuracy. The apparatus and techniques described herein are particularly well-suited for use in manufacturing fly fishing rods. In one preferred embodiment of the invention each rod section is formed in a single piece having a polygonal exterior with integral spine. According to an aspect of the present invention the sections are formed in a pressure molding process, which compresses the fibers and pulls them in tension while the resin is cured.

It has not been fully appreciated in the industry that the joining of sections of material, such as bamboo or composite material to form a rod will always result in sub-optimal characteristics, as described previously. Substituting a composite lay-up for sections of bamboo does nothing to overcome those limitations. It should be appreciated that composite lay-ups provide optimum strength only when continuous fibers traverse the entire lay-up, as stresses on the fibers are transferred evenly without significant discontinuity through the matrix of fibers in the composite lay-up.

The fishing rod described herein is manufactured in a single piece with an integral spine. The fibers in the lay-up are optimally arranged through the lay-up to provide the desired feel and flex, while the integral nature increases strength and prevents the possibility of cross section collapse and joint breakage. The feel of the rod is one of the most significant advantages of the invention. While other rods have a feel of increased rate of flexure when long-casting, this polygonal, integral-spine rod seems to stiffen or "lock out", the greater distance it is cast. The high strength-to-weight allows creating rods, in particular fly rods, having smaller cross-sectional areas which reduce wind resistance. It should be appreciated as well that the shape of the rod can also provide aerodynamic advantage. Moreover, a rough finish may be applied or created on the finished rod described to further reduce the rod's induced parasitic drag in a similar manner that the dimples on a golf ball provide turbulence that reduce in flight parasitic drag.

To provide the desired characteristics of feel and flexure while keeping weight to a minimum a number of additional design elements are incorporated within the fly fishing rod of the present invention, such as flexing ferrules that don't significantly alter longitudinal flex characteristics, along with composite line guides, tips, reel seats, reel keepers, and butt caps. These additional elements are preferably utilized with the fly rod so that the weight and feel advantages of the one-piece construction are not compromised with elements that are heavy, bulky, or that otherwise detract from the feel and action.

The invention is amenable to various embodiment, a few of which may be described as follows. An embodiment of the present invention can be described as a composite fishing rod, comprising: (a) at least one elongate tapered section of a composite material having a polygonal exterior; (b) a composite material spine within the tapered section joined between opposing joints or facets of the polygonal exterior; (c) wherein the spine and the polygonal exterior are formed in a single integral section at the time of curing the composite material; (d) at least one ferrule configured for connecting between elongated tapered sections if the fishing rod includes more than one elongated tapered section; and (e) wherein the fishing rod is configured for attachment of a handle, reel seat, and line guides. In general the finished rod comprises a number of sections, for example a fishing rod, such as a fly fishing rod, having at least two elongated tapered sections configured for interconnection with ferrules.

Variations of this embodiment can be created by attaching an inlay of at least one decorative and/or additional structural material to exterior portions of the polygonal exterior. By way of example and not limitation the decorative and/or additional structural materials can be selected from the group of materials consisting essentially of: woods, bamboos, minerals, composites, metals, textiles, and other natural or synthetic materials which can be bonded to the fishing pole. Moreover, the rod may be wrapped with decorative and/or additional structural fibers consisting of: glass, carbon, aramid, silk, polyester or other natural and synthetic fibers. All or some of the aforementioned variations may be added during and/or after the curing phase of the blank manufacture. It will be appreciated that paints, powder-coats, dyes, pigments, metals, and other covering and protective layers may also be deposited on the surface of the rod, and/or over or under material inlays bonded to the rod during and/or after the curing process. The inlays according to one implementation are bonded between composite material ridges extending outwardly from between the facets of the polygonal exterior, such that the spaces between the composite material ridges are inlaid with the decorative and/or additional structural materials.

The typical construction of the rod is from a composite material comprising a high tensile strength fiber material (e.g., carbon fiber, aramid, s-glass, metal, and other materials that have a high tensile strength). It should be appreciated that the apparatus and methods of the present invention are equally applicable to moderate tensile strength materials, such as conventional fiberglass, moreover, some applications are anticipated which couple this lower modulus material with higher modulus material to facilitate its higher strain-to-failure potential. The high tensile strength fiber material, such as carbon fiber, is preferably utilized in a form pre-impregnated with resin prior to being formed into a rod section, or impregnated with resin at the time of forming the rod section.

Another example embodiment of the invention can be described as a composite fishing rod, comprising: (a) at least one elongate tapered section of a composite material having a polygonal exterior; (b) a composite material spine within the integral tapered section joined between opposing joints or facets of the polygonal exterior; (c) wherein the spine and the polygonal exterior are formed in a single integral section at the time of curing the composite material; (d) a plurality of line guides; (e) a handle coupled to a first end of one elongate tapered section, the first end of the tapered sections having a diameter which exceeds that of the opposing, second, end of the elongate tapered section or other sections to be joined thereto in forming the fishing rod; (f) a reel seat configured for attachment adjacent the handle; and (g) means for selectable retaining a reel upon the reel seat. The composite material spine comprises a plurality of intersecting elongate planar sections whose ends attach at the joints between facets of the polygonal exterior to provide optimum support as the cross-section comprises interconnected triangles. The space between the polygonal exterior and the spine is either unfilled, or filled with a lightweight material, such as Aerogel™, carbon, aramid, glass, metal, or viscous material like resin, gel, plastic, liquid or gas vapor or any combination thereof.

In one embodiment sections of the rod are joined by a ferrule which comprises: (a) a female ferrule end having a tapered recess in an end of a first elongate tapered section into which a first tapered receiving sleeve is joined; and (b) a male ferrule end on a second elongate tapered section having a tapered protruding portion of the integral spine over which a second tapered protruding sleeve is joined; and (c) wherein the first and second tapered sleeves are configured for slidable engagement with one another.

One aspect of an embodiment of the invention can be described as a line guide which comprises: (a) a circular ring of material providing a low friction interface with fishing line and a sufficient hardness to provide long wear; (b) a guide housing into which the circular ring of material is retained; (c) a loop of composite material for receiving the circular ring of material within the guide housing; and (d) a composite material foot assembly upon the housing joined to the composite loop and having first and second projective means extending from a flexible bridge element; wherein all housing elements may be formed, molded, and cured form one continuous loop of fibers; and wherein the first and second projective means are configured for being attached to the rod section. The circular ring of material is selected from the group of materials consisting essentially of ceramic, glass, minerals, and the like. One particularly beneficial material is corundum, which provides hardness, long wear, and which can provide enhanced aesthetic appeal.

One aspect of an embodiment of the invention can be described as a reel seat and means for selectable retaining a reel upon the reel seat, comprising: (a) a reel seat to proximal handle end interface configured for attachment to the rod section proximal the handle and having a molded and cutout shape for receiving a front retention flange of a reel; (b) a reel seat sleeve having an exterior configured for mounting a reel; (c) an externally threaded section configured with exterior threads and an interior opening adapted for attachment to the rod section; (d) a threadable reel retention element having an opening configured for receiving a rear retention flange of a reel between the interior of the opening and the exterior of the reel seat sleeve; and (e) wherein the elements of the reel seat are made of a composite material.

An embodiment of the present invention may also be described as a method of fabricating the sections of a composite fishing rod having a polygonal exterior with integral spine supporting the polygonal exterior, comprising: (a) wrapping or laying composite material about each of a set of tapered mandrels; (b) forming composite material about the set of tapered mandrels; (c) enclosing the set of mandrels and composite material within a tapered interior cavity mold, and/or outer mandrel, and/or pressure vessel; and (d) applying sufficient pressure, or combination of heat and pressure, for curing the composite material into a solid rod section having a polygonal exterior with integral spine; (e) removing the rod section from the interior cavity mold, and/or outer mandrel, and/or pressure vessel; and (f) wherein the composite material comprises a high tensile strength fiber material utilized with a resin system which joins the material fibers upon hardening. Depending on the mandrel material, an optional step is removing the set of mandrels from the composite material after curing, such as when using metal mandrels, or those which are otherwise not suitable for remaining within the rod, such as higher density foams that are removed by dissolving or melting them.

Another embodiment of the present invention may also be described as a method of fabricating the sections of a composite fishing rod having a polygonal exterior with integral spine supporting the polygonal exterior, comprising of pulling raw fibers pre-infused and/or infusing with resin past pressurized and/or heated variable die and/or die sets.

The present invention provides a number of beneficial aspects which may be embodied singly or in various combinations. These aspects include but are not necessarily limited to the following.

An aspect of the invention is to provide a fishing rod having optimized feel and strength to weight ratio provided by unique construction, and design dynamics.

Another aspect of the invention is to provide a fishing rod having a visually interesting appearance.

Another aspect of the invention is to provide a fishing rod having all linear fibers, in similar manner to bamboo.

Another aspect of the invention is to provide a fishing rod that can be manufactured utilizing industry standard pre-preg carbon fibers, or other high-tensile or high strain resistant materials.

Another aspect of the invention is to provide a fishing rod that is springier and more responsive than a circular rod.

Another aspect of the invention is to provide a fishing rod having greater sensitivity than conventional rods.

Another aspect of the invention is to provide a fishing rod having greater transfer of vibration from the line.

Another aspect of the invention is to provide a fishing rod having more efficient transfer of energy, wherein the response is progressive but provides ample power to cast a full line.

Another aspect of the invention is to provide a fishing rod with a fine tip diameter such as produced with a diameter of approximately 0.045 inches.

Another aspect of the invention is to provide a fresh water fly rod which is light weight, such as around 75 grams, or less, for a four piece rod in contrast with other fly rods that are about 90 grams.

Another aspect of the invention is to provide a fishing rod with increased durability.

Another aspect of the invention is to provide a fishing rod having a solid tip and multiple of longitudinal cells which are hook and nick resistant, maintaining a redundancy of fibers at its exterior apices.

Another aspect of the invention is to provide a fly rod which can be manufactured from the finest epoxies and materials, such as military specification epoxy 5,500 psi, having high peel and high shear strength.

Another aspect of the invention is to provide a fly rod having heat treated Titanium line guides and tip top, that is resistant to the environment.

Another aspect of the invention is to provide a fishing rod having a synthetic Ruby (Corundum)/Carbon stripping guide, having high hardness (i.e., Mohs hardness 9—only diamond will scratch it.)

Another aspect of the invention is to provide a fishing rod section having a unique see-through end which identifies the construction of the rod.

Another aspect of the invention is to provide a fishing rod having seamless carbon fiber reel seat.

Another aspect of the invention is to provide a fishing rod having carbon fiber reel keepers, up locking western trout grip.

Another aspect of the invention is to provide a fishing rod having a carbon fiber winding check.

Another aspect of the invention is to provide a fishing rod having a Titanium hook keeper.

Another aspect of the invention is to provide a fishing rod having easy tapered spigot ferrules which grip both spine and shell.

Another aspect of the invention is to provide a fishing rod that can be manufactured with a compression molding process in which fibers are pulled in tension while the epoxy cures.

Another aspect of the invention is to provide a fishing rod whose sections come out of the mold finished in one piece with an integral spine.

Another aspect of the invention is to provide a fishing rod in which no glue seams or glued-in spines are required, as an integral spine is provided having a homogenous material cross section, and/or variegated material cross section.

Another aspect of the invention is to provide a fishing rod which is sufficiently durable and break resistant to allow the manufacturer to sell the rod with a lifetime guarantee.

Further aspect and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 3 is a cross-section of a single-piece rod spine according an embodiment of the present invention, shown with an inlaid and/or molded exterior.

FIG. 4 is a cross-section of a single-piece rod section according an embodiment of the present invention, shown with an inlaid and/or molded exterior.

FIG. 5 is a cross-section of a single-piece rod section according an embodiment of the present invention, shown with an inlaid and/or molded exterior between extending protrusions.

FIG. 6A-6B are side views of a ferrule according to an embodiment of the present invention, showing the sections separated in FIG. 6A and assembled in FIG. 6B.

FIG. 7 is a side view of an assembled ferrule of FIG. 6B attached to rod sections.

FIG. 8 is a side view of the assembled ferrule of FIG. 7, shown with a polygon cover element.

DETAILED DESCRIPTION OF EMBODIMENT(S)

Referring more specifically to the drawings for illustrative purposes, the present invention is embodied in the method generally described in FIG. 1 to FIG. 18. The following description is presented to enable one of ordinary skill in the art to make and use the invention as provided in the context of a particular application and its requirements. Unnecessary technical details, which extend beyond the necessary information allowing a person of ordinary skill in the art to practice the invention, are preferably absent for the sake of clarity and brevity. Furthermore, it is to be understood that inventive aspects may be practiced in numerous alternative ways by one of ordinary skill without departing from the teachings of the invention. Therefore, various modifications to the preferred embodiments will be readily apparent to those skilled in the art, and the principles defined here may be applied to other embodiments. Thus the present invention is not intended to be limited to the embodiments shown, but is to be accorded the widest scope consistent with the principles and novel features disclosed herein.

1.0 Rod Section Structures.

FIG. 1A-FIG. 1D illustrates an example embodiment 10 of a one piece, hollow, carbon fiber fishing rod with an integral one piece carbon fiber spine. The result of this construction is a fishing rod that has different and favorable attributes in relation to either a split cane bamboo rod or tubular carbon fiber rod, or any currently manufactured polygonal or round rod section.

Figure 1A:
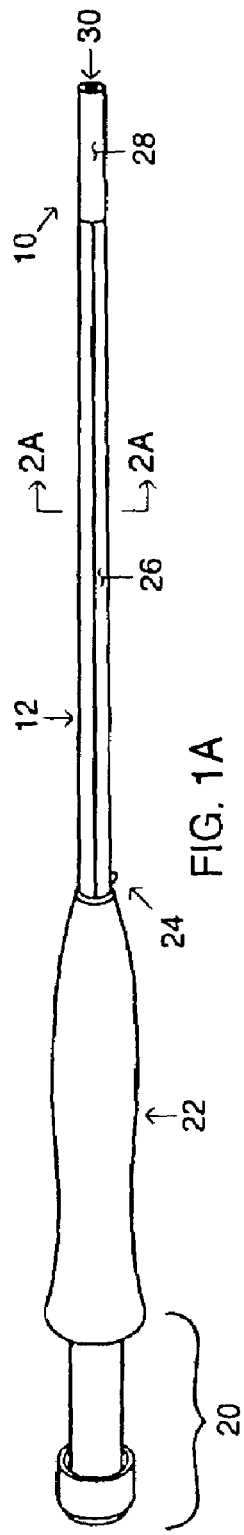
FIG. 1A-1D are side views of a fly fishing rod according to an embodiment of the present invention, shown in four sections which can be interconnected to complete the rod.
Figure 1B:
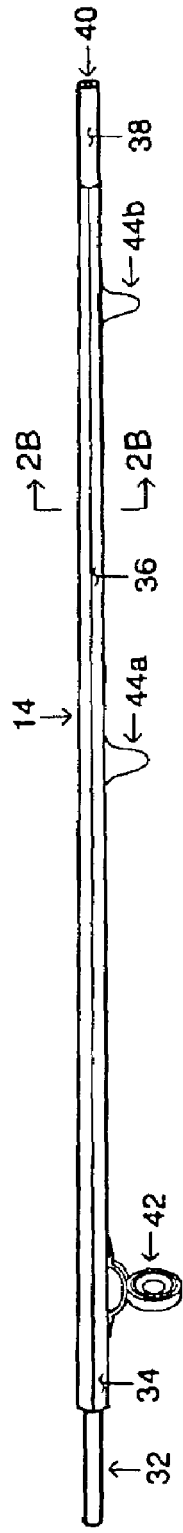
Figure 1C:
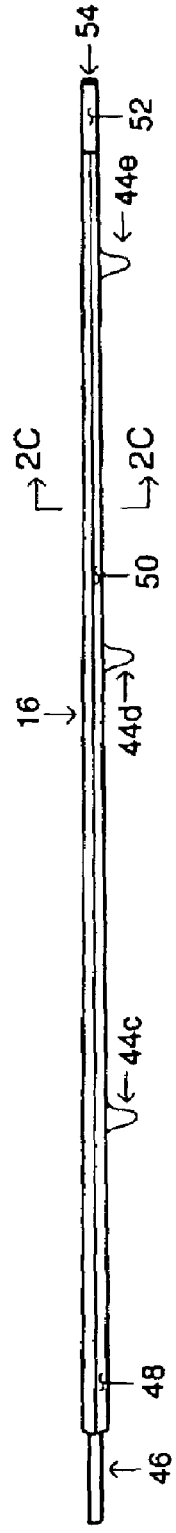
Figure 1D:
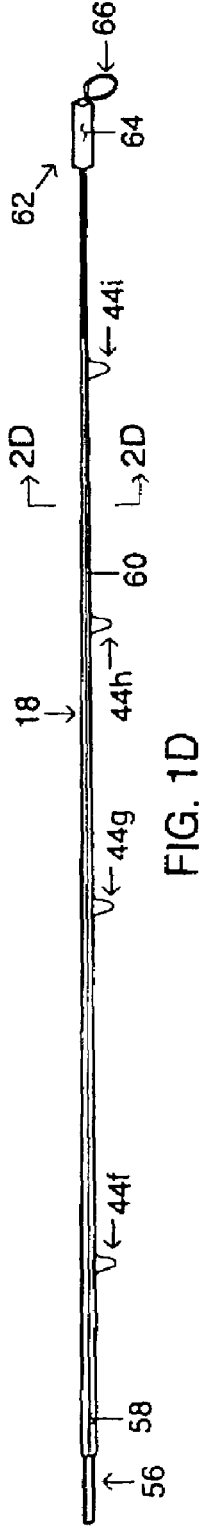

In this embodiment the carbon fiber spine is created integral with the exterior of the rod by a lay up method according to the present invention. According to the invention the rod may be constructed as a single rod section, or more preferably multiple rod sections which are joined together, therein simplifying manufacture and transport of a rod. It should be appreciated that many fly fishing rods are approximately nine feet in length. FIG. 1A-1D depict a fly fishing rod 10 of four sections: a butt section 12 is shown in FIG. 1A; a first mid-section 14 is shown in FIG. 1B; a second mid-section is shown in FIG. 1C; and a tip-section 18 is shown in FIG. 1D. The cross-sections of each rod section taper down from the proximal end (left side of the page) and narrow toward the distal end (right side of the page). The rate of taper is an important factor in providing a correct feel and action to the finished rod.

FIG. 1A depicts the butt section 12 having a reel seat 20 proximal to handle 22, from which is shown extending an optional hook keeper 24. The elements comprising reel seat 20 and handle 22 surround a proximal portion of composite polygonal rod section 26, such as in the form of a hexagon as shown. It should be appreciated that the rod section can be configured in other polygon shapes, such as triangle, square, pentagon, heptagon, octagon, or other polygonal cross-section forms, without departing from the teachings of the present invention. The distal end 28 of butt section 12 terminates with a first attachment means, for example a ferrule aperture 30 adapted for receiving a ferrule extension of the next section. It will be appreciated that the present invention may be implemented with any desired ferrule configurations without departing from the teachings of the present invention. An example ferrule embodiment is described later in the specification.

FIG. 1B depicts the first mid-section 14 having a ferrule extension 32 extending from a proximal end 34 of composite polygonal rod section 36, whose distal end 38 terminates in a ferrule aperture 40. A first line guide 42 is shown near the proximal end of the first mid-section 14, which is preferably formed with a low friction circular aperture. Additional line guides 44a, 44b are depicted as wire formed line guides which are provided along the remaining length of the fly rod (44a-44i).

FIG. 1C depicts the second mid-section 16 having a ferrule extension 46 extending from a proximal end 48 of composite polygonal rod section 50, whose distal end 52 terminates in a ferrule aperture 54.

FIG. 1D depicts the tip-section 18 having a ferrule extension 56 extending from a proximal end 58 of composite polygonal rod section 60, whose distal end 62 terminates in top sleeve 64 retaining a line guide 66 (i.e., wire-formed or composite line guide with or without an insert).

It should be recognized that conventional polygonal rod constructions are formed from separate length-wise pieces which are then glued together to form the rod cross-section. For example, large rods have been made with a plurality of angle sections, or "T" sections which are then glued to form the rod section. However, in creating the present invention it has been appreciated that the strength, mass, and action of the rod sections are compromised as a result of lateral joining of segments to form the rod cross-section. The strength of composite materials, such as carbon fiber composite, is derived from the elongate fibers in the carbon fiber weave used in the lay-up. When the cross-section of a rod requires the joining of separate segments to create the desired cross section, then the composite weave does not cross from one of those sections to the other, thus strength is severely compromised. In addition, the action and strength of the rod then relies on the strength, consistency and resiliency of the joints between these segments. In addition, problems arise with regard to registration (alignment) of the segments, as well as, twist and spiral may be imposed, also adherence between the glue and segments, assuring the proper amount of glue is provided between each segment, temperature coefficient problems which can compromise rod longevity, and so forth.

Figure 2B:
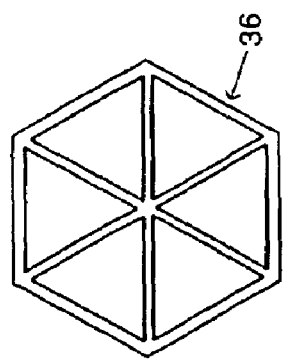
FIG. 2A-2D are cross-sections of the hexagonal rod sections of FIG. 1A-1D according to an embodiment of the present invention.
Figure 2D:
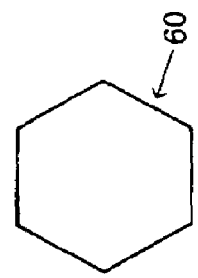
Figure 2A:
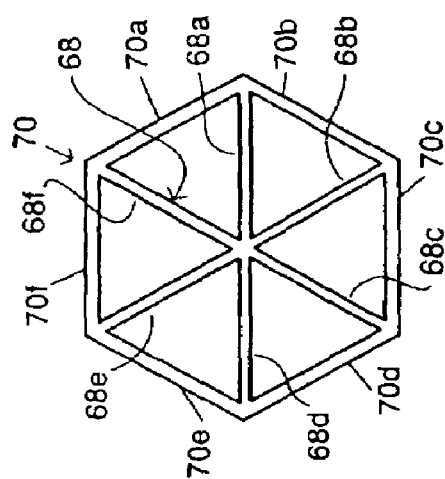
Figure 18:
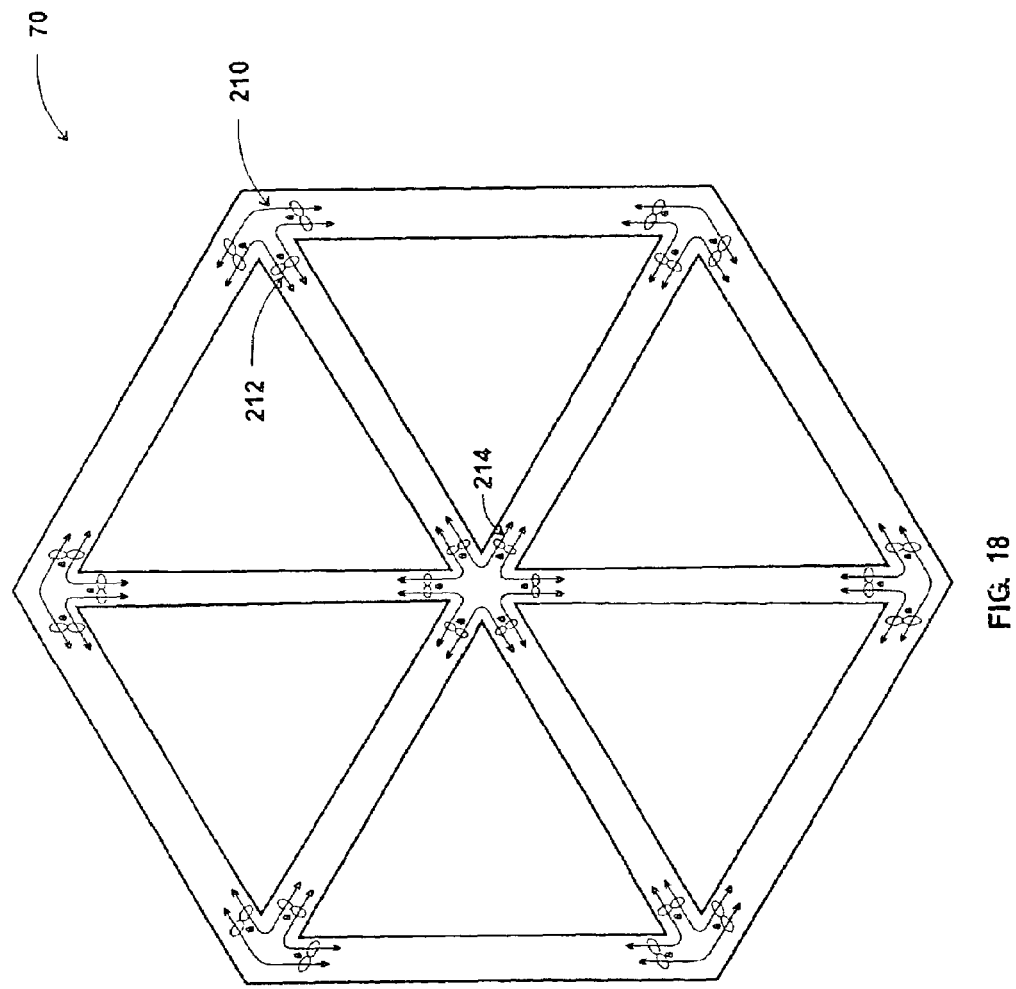
FIG. 18 is a cross-section of the hexagonal rod section of FIG. 2A, showing an example of fiber paths within the integral section according to an aspect of the present invention.

FIG. 18 is an example of fibers interconnecting elongate sections of the fishing rod whose sectional view is shown in FIG. 2A. Rod section 70 is shown in the figure by way of example and not limitation representing fibers in the completed fishing rod structure in which composite material crosses over from each exterior facet to adjacent exterior facets and from each exterior facet to each elongate planar section of said spine. Fiber direction is represented by the arrowed lines in the figure with fibers along the exterior 210 joined to spine fibers 212 by resin, shown as the interconnected ovals, which impregnates both fiber paths. Miniature "lock symbols" are shown adjacent the ovals to represent the bonding of the fibers throughout the whole rod structure, wherein the spine is termed integral to the exterior. The fibers through the ends and center of the spine cross over spines and exterior as shown by 212 and 214. It should be appreciated that the lines show a fiber path and not necessarily a single web of fabric. In addition, it should be noted that the figure is provided by way of example of fibers crossing over from one section to another which integrally locks together all these sections of fiber with impregnated resin. It should be appreciated that many other fiber paths and combinations are described elsewhere in the specification.

FIG. 2A-FIG. 2D illustrate cross-sections 26, 36, 50, 60 of the composite polygonal rod sections shown in FIG. 1A-FIG. 1D, respectively. A very important aspect of the present invention is the integral nature of construction with the spine and exterior of the rod being integral to one another. In FIG. 2A it is seen that spine 68 is formed having sections 68a-68f, while rod exterior 70 is shown having facets 70a-70f. An alternative cross-section illustrated in FIG. 2A' shows spine 68' attached to the center of each facet 70' instead of at each apice. When forming the rod section the composite material is laid-up so that the elongated fibers of the matt pass through spine sections 68a-68f as well as through exterior facets 70a-70f, thus melding-together all the structural elements into a single unit having improved action characteristics, accuracy, and strength to weight ratio.

The strength of the composite fibers is thus imparted to the entire construction. No glue joints are required. Furthermore, since the fibers of the lay-up cross between all spines and all exterior sections glue joint strength is not relied upon and the forces applied to the rod are evenly distributed through the rod.

Figure 2C:
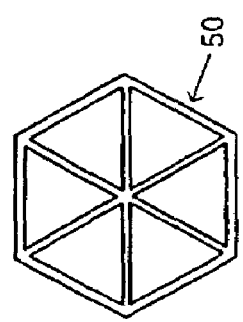

FIGS. 2A, 2B and 2C illustrate rod sections having interior voids to reduce weight, while section 60 in FIG. 2D is depicted as a solid section due to its very small cross-sectional area. It should be appreciated that more or less of the rod may be formed from solid sections (i.e., making an elongate portion of the tip section hollow, or a portion of the second mid-section solid) without departing from the present invention. It should also be noted in the progression of cross-sections 26, 36, 50, 60 in FIGS. 2A-2D that the thickness of exterior facets 70a-70f as well as the spine sections 68a-68f may diminishes as the rod section tapers. By way of example, one fly fishing rod was manufactured having approximate cross-section dimensions as described in the following paragraph.

Current production techniques have achieved hollow rod sections as illustrated in FIG. 2C, to have a minimum exterior cross section dimension of 0.100 inch; moreover, current production techniques allow for hollow rod sections as illustrated in FIG. 2A, to have a maximum exterior cross section dimension of 0.350 inch. In addition solid rod sections as illustrated in FIG. 2D have been manufactured to have a minimum exterior cross section dimension of 0.045 inch, and a maximum exterior cross section dimension of 0.125 inch;

wherein, these manufactured rod sections have an approximate length of 30 inches each. In a current embodiment of this invention, hollow exterior facets 70a-70f have a wall thickness of 0.018 inch, while the integral spine member 68a-68f has a wall thickness of 0.009 inch. These examples are included only to illustrate what has currently been accomplished, and the examples are not to limit future embodiments of this invention, which anticipate thicker and thinner hollow and solid cross sections, as well as, shorter and greater lengths of rod sections.

It should be noted that in this embodiment each planar section of spine 68 meets up at the intersection of two exterior facets, for example spine section 68a meets the exterior shell at the junction between facet 70a and facet 70f. This configuration of the spine to the exterior facets provides more strength as it provides support at the edges of each facet, instead of at the center of each, thus leaving a weakness at the joint between facets. In this configuration the rod structure is an integral collection of n triangular sections—depending on the number of exterior facets. It should be appreciated, however, that the integral rod sections of the present invention can be formed with the spine meeting at the center of the facets or any number of other spine to exterior alternatives, such as even utilizing more or fewer than one spine segment per exterior facet.

FIG. 3-FIG. 5 illustrate alternate embodiment of the rod cross-sections that may be utilized within the present invention. FIG. 3 depicts a segmented constructed rod 80 having a single piece composite spine 82 upon which exterior segments 84 are molded. It should be appreciated that segments 84 may leave an interior space 86 hollow, or filled with a similar or less dense material, such as including more air bubbles, than the exterior faces. This form of construction will provide the range of benefits from integrally forming the spine with exterior facets; however, overall mass will increase and the rod's dynamic action may be reduced. FIG. 4 illustrates an alternate embodiment 90 in which the spine and exterior 92 are formed integrally, over which a decorative and/or additional structural exterior 94 is attached, or otherwise applied. The exterior may be any material, such as wood or bamboo inlays, as well as, additional structural materials including carbon, metal, glass, or plastic. The exterior material typically is for increasing the esthetic appeal, although it can support other applications. FIG. 5 illustrates an embodiment 100 that has an integral spine with exterior facets 102. In this embodiment the spine is continued at each apex to provide protrusions 104 between which material can be attached, such as inlays of wood or bamboo or structural materials including carbon, metal, glass, or plastic. When the exterior is properly finished the rod has a very beautiful appearance with composite material lines at the edges and the inlays on the sides. It should be recognized that the composite edges increase durability as it is typically more durable than having inlay material form the edges.

2.0 Rod Section Interconnection.

FIGS. 6A and 6B illustrate an example ferrule embodiment 110, shown before assembly in FIG. 6A and joined together in FIG. 6B. The coupling comprises a male end 112 configured for friction fit into a female receptacle end 114. Currently a first ferrule plug 116 is shown which has been machined, ground, and molded from a bundle of continuous, and combination of linear and bias fibers. Ferrule plug 116 is coupled through collar 118 to a protruding post 120, which is preferably slightly tapered along its length or at the end. A receptacle 122 is shown within receiving socket 124 coupled through collar 126 to a second plug 128. The novelty of this ferrule design is that each ferrule end becomes integral with the shell and spine of the rod section. This design also allows for adjustment changes when alignment of two rod sections with an appropriate pair of ferrules is necessary; therefor, compensating for any slight deformation of individual rod sections, as well as, providing simplicity of re-alignment of replacement sections to broken rods if so necessary.

FIG. 7 and FIG. 8 illustrate the assembled ferrule depicted in FIG. 6B attached for joining two rod sections 142, 144. In FIG. 7 the ferrule plugs of the male and female ends are assembled into the respective rod ends 142, 144. FIG. 8 illustrates polygonal (depicted as hexagonal in this embodiment) caps 146, 148 covering the respective ferrule ends.

Although plugs 116 and 128 are depicted as shallow cylindrical plugs it will be appreciated that they may be formed cylindrical or polygonal with an extended length wherein the inserted plug length is much greater than the plug diameter. In addition, it is preferred that extended length plugs have some form of hollow interior tapering, wherein they do not introduce a discontinuity in the flexure profile of the rod.

Figure 9A:
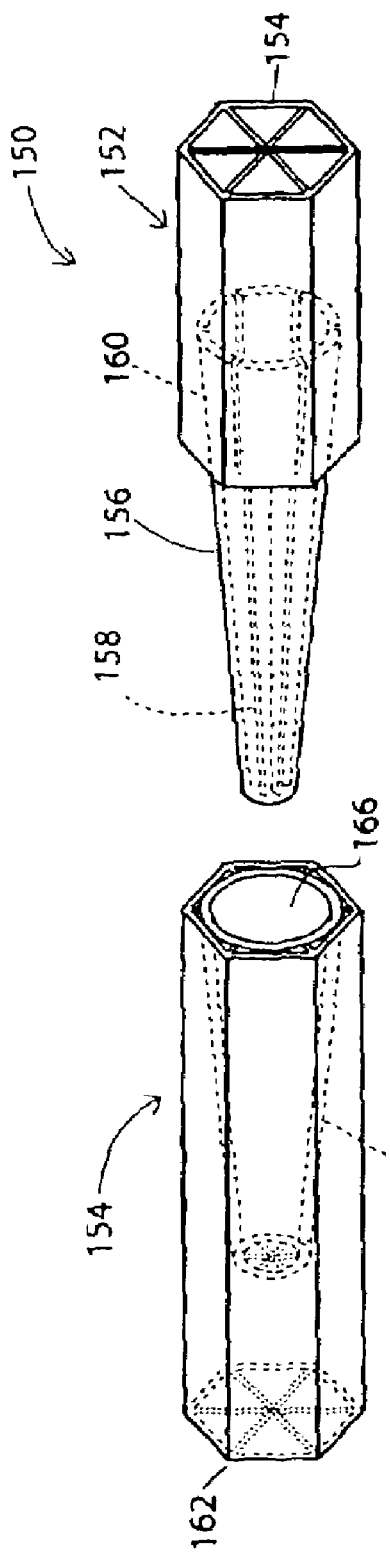
FIG. 9A-9B are side views of a tapered ferrule according to an embodiment of the present invention, showing the sections separated in FIG. 9A and assembled in FIG. 9B.
Figure 9B:
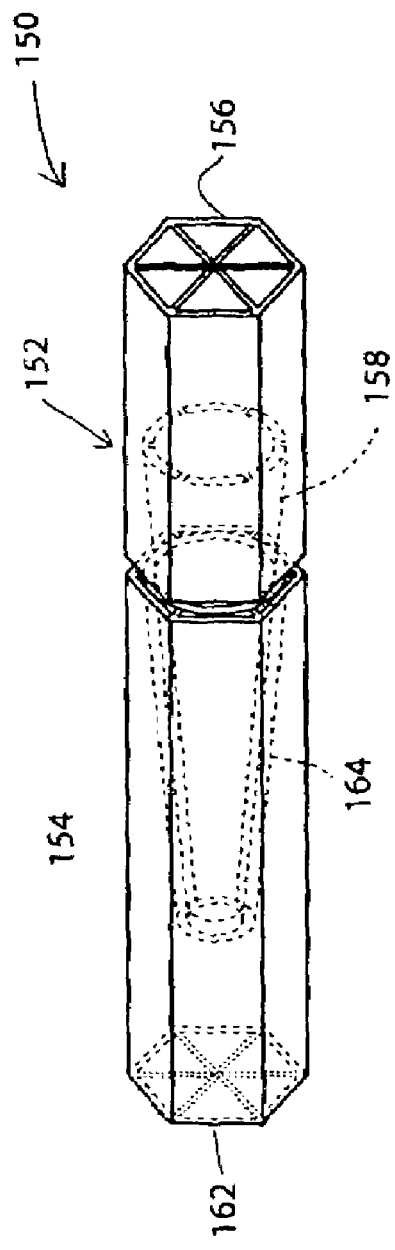

FIG. 9A-9B illustrate examples of a tapered ferrule interface 150 shown prior to assembly in FIG. 9A and assembled in FIG. 9B. A male ferrule end 152 is shown configured within a first rod section 154. The protruding ferrule end 156 is shown comprising the extended spine 158 cut down into a tapered cone, over which a cover is joined which is slotted on open end 160 for engaging the spine within rod section 154. Female end 154 is shown adapted with a tapered receiving sleeve 164 joined into a cut taper within rod section 162, wherein open end 166 is adapted for receiving protrusion 156. It should be appreciated that the taper of 158, 164 can be any desired shape and need not be conical.

Figure 10:
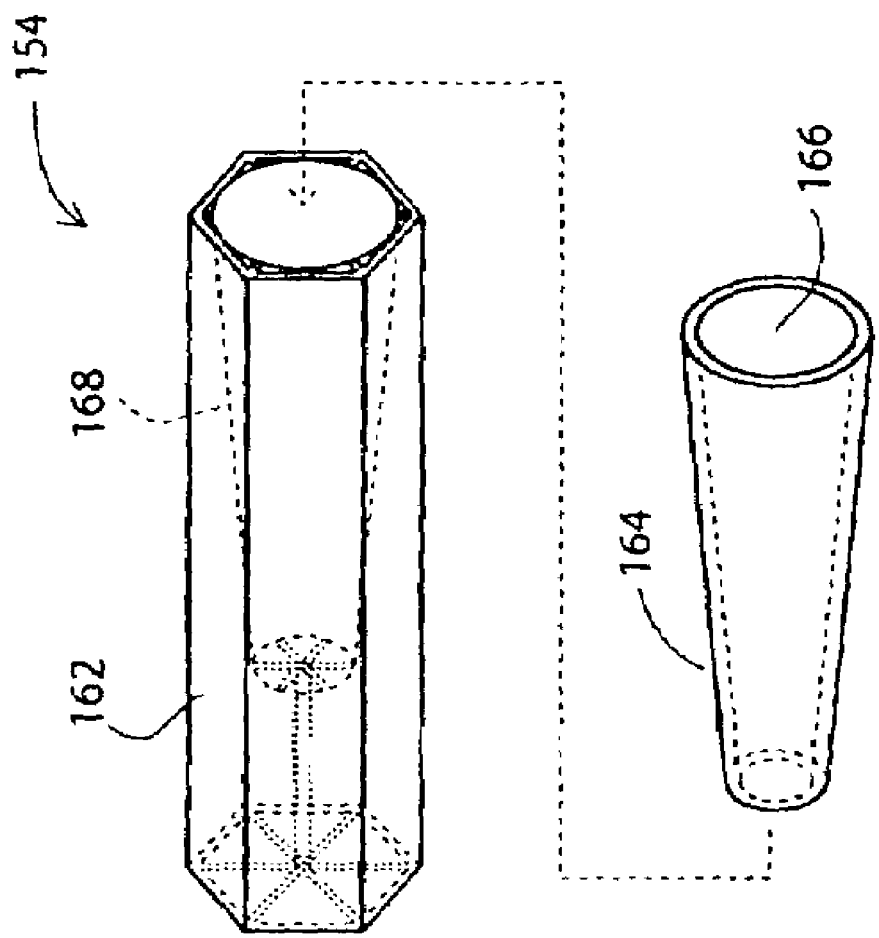
FIG. 10 is a side view of assembling the tapered female end of the ferrule shown in FIG. 9A.
Figure 11:
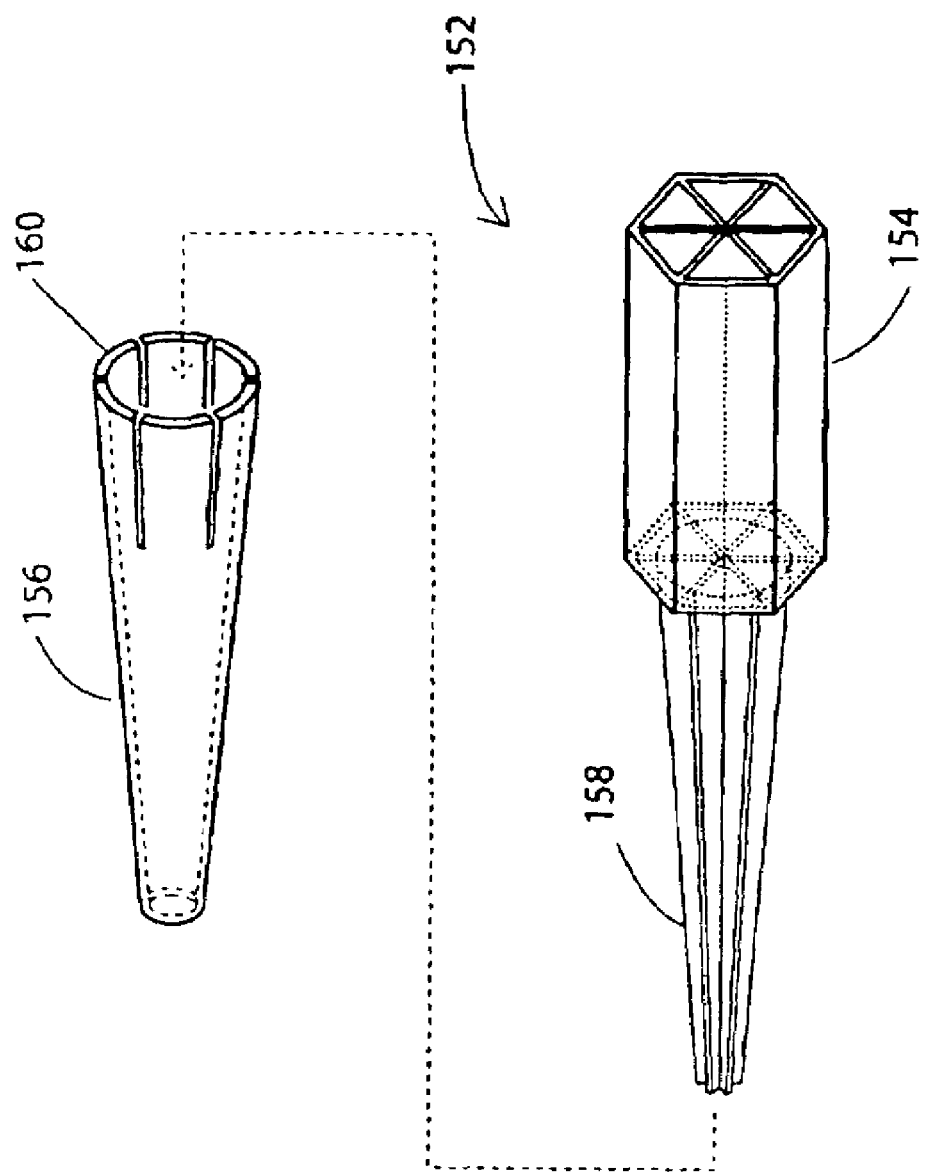
FIG. 11 is a side view of assembling the tapered male end of the ferrule shown in FIG. 9A.

FIG. 10 and FIG. 11 depict an example of constructing the halves of the ferrule depicted in FIGS. 9A and 9B. In FIG. 10 female ferrule portion 154 is depicted as being assembled from a tapered sleeve (cone) 164 having a large first end 166 adapted for receiving the male ferrule end. The end of rod section 162 is internally bored with a taper 168 to receive sleeve 164, which is attached by adhesives, resins, thermally joined, joined by a fastener, or any convenient method or combination thereof. In FIG. 11 the construction of a male ferrule end 152 is exemplified with the exterior end of rod section 154 being removed (e.g., laser cut, cut in a lathe, abraded away, or other convenient technique) leaving a tapered spine portion 158 over which a tapered sleeve is joined 156. Tapered sleeve 156 is preferably configured with the large end having slots which engage the webs of the spine sections, therein securing the sleeve and helping to transfer loads through the ferrule to the rod section. It will be appreciated that although this ferrule is typically more complex than the plug style ferrule, the taper is expected to aid in providing increased uniformity from one rod section to another, which improves the action of the rod.

Figure 12A:
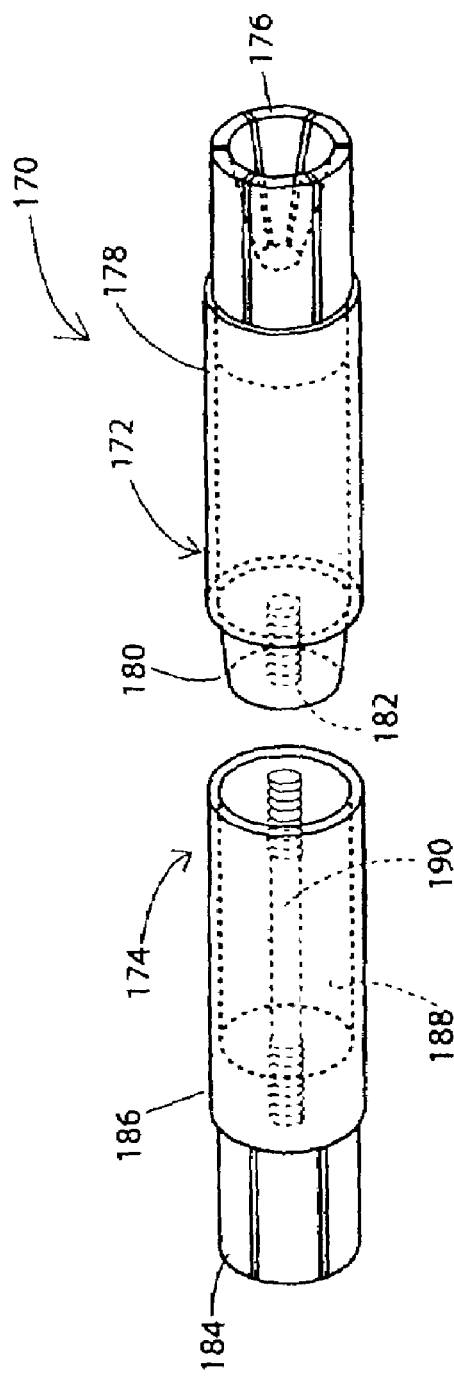
FIG. 12A-12B are side views of a threaded ferrule according to an embodiment of the present invention, showing the sections separated in FIG. 12A and assembled in FIG. 12B.
Figure 12B:
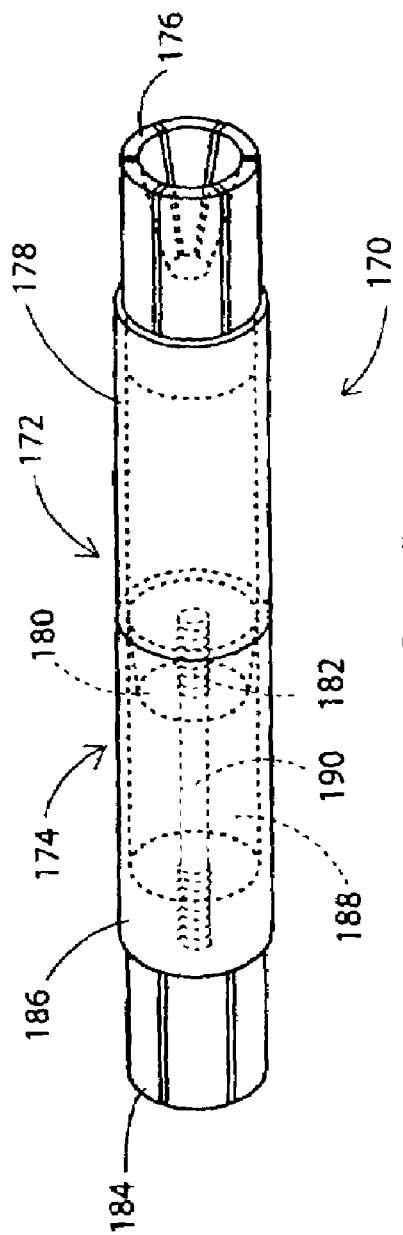

FIG. 12A-12B illustrate an example embodiment of a metal and/or composite tensor ferrule 170 which can be implemented on the rod of the present invention.

Ferrule 170 is shown disassembled in FIG. 12A and assembled in FIG. 12B. A male-female ferrule section 172 is configured for threaded engagement with a female-male ferrule section 174. A plug 176 is joined (e.g., adhesives, heat bonding, fasteners, and so forth) to first ferrule housing 178, a portion of which is preferably hollow. A proximal end 180 protrudes from ferrule section 172 and is preferably tapered to facilitate alignment with the opening in ferrule section 174. An internal threaded section 182 is adapted for receiving a threaded rod section 190 from ferrule section 174. In ferrule section 174 a plug 184 is joined to housing 186 preferably having an elongate hollow portion 188 through which threaded rod 190 extends. The inclusion of the hollow portion 188 within this portion of the ferrule allows threaded rod 190 to flex and/or stretch over its length, such as approximately one-half inch depending on the diameter of the sections being joined. It should be realized that the rod ferrule and plug ends are joined into the ends of rod sections after they have been bored out to receive the plugs, which are preferably joined with epoxy resin or other fastening means.

Plug 176 is depicted as an elongated member having an internal tapered recess to more smoothly transfer forces up to the ferrule. Numerous alternative exist for shaping the interface between the rod and ferrule. For example, plug 176 may have a polygonal exterior and so forth.

Figure 13A:
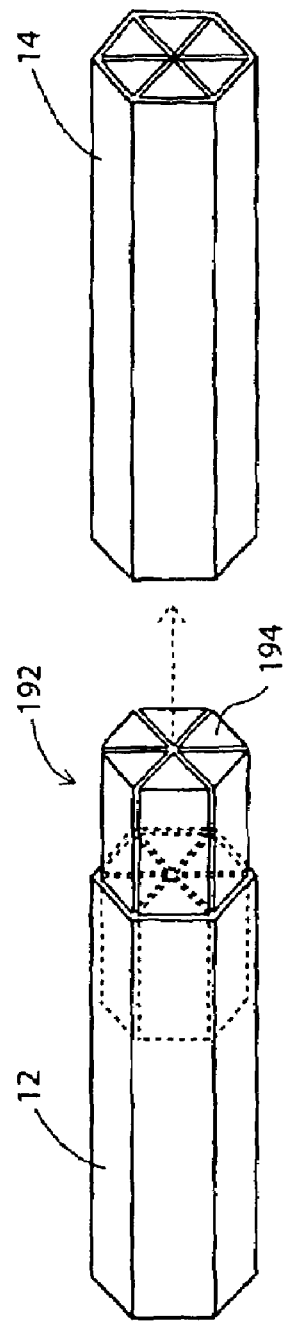
FIG. 13A-13C are side views of a permanent scarf joint according to an embodiment of the present invention, illustrating the sections separated in FIG. 13A, permanently assembled in FIG. 13B, and shown with polygonal cover element in FIG. 13C.
Figure 13B:
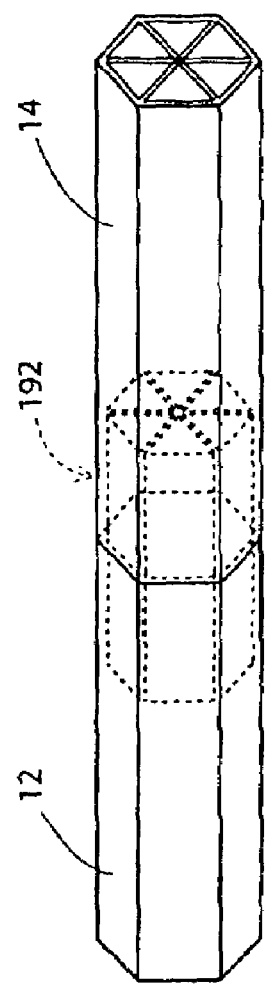
Figure 13C:
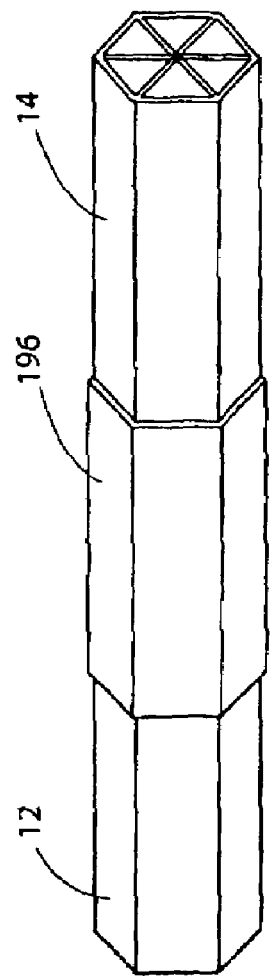

FIG. 13A-13C depict a permanent scarf joint method for joining two separate rod sections. FIG. 13A illustrates two separated rod sections 12 and 14 with internal, hollow, filled, or solid polygonal reinforcement members 194 with an appropriate plurality of members 192 to fill the hollow rod cross section. FIG. 13B illustrates the two separate rod sections being permanently joined by adhesives, resins, thermally joined, joined by a fastener, or any convenient method or combination thereof. FIG. 13C illustrates the two joined rod sections with a permanently adhered cover 196 which completes the scarf joint. This scarf joint typically measures 0.750 inch in total length. It should be noted that the example triangular member 194 may be used in all other ferrule embodiments of this invention.

It should be readily appreciated that the rod of the present invention can be implemented with any desired form of ferrule without departing from the teachings of the present invention. The embodiments herein are shown by way of example and a rod implemented using these elements singly or in any desired combination still does not depart from the teachings presented herein.

3.0 Reel Seat, Handle and Line Guides.

Figure 14A:
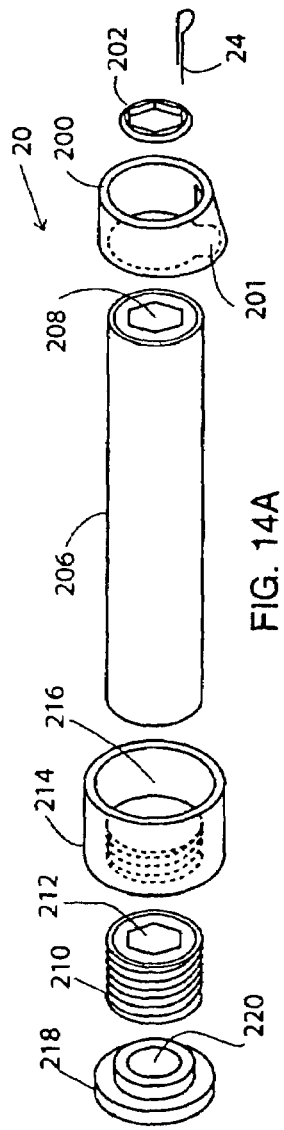
FIG. 14A-14C are side views of the reel seat assembly being assembled into a handle on an end of the largest rod section.
Figure 14B:
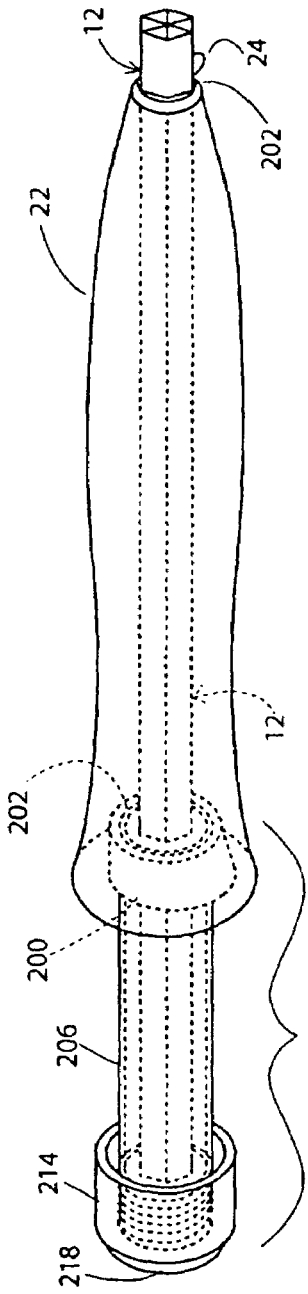
Figure 14C:
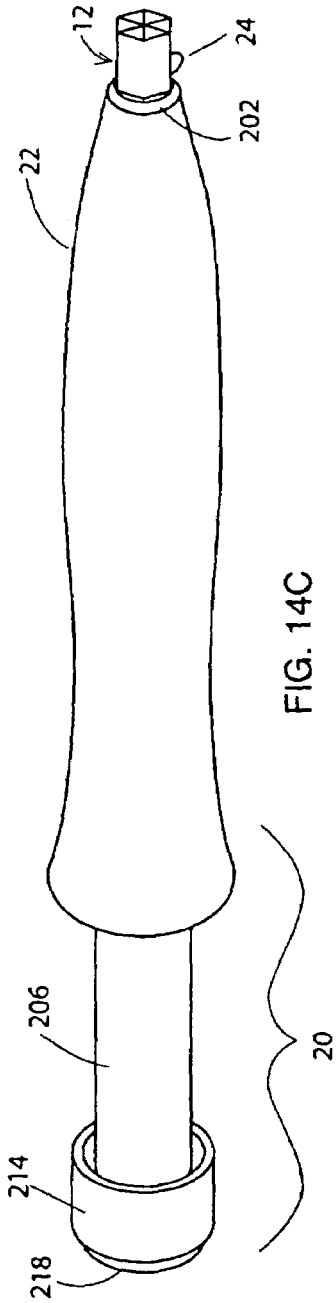

FIG. 14A-14C illustrate an example embodiment of a reel seat 20 and handle portion 22 according to an embodiment of the present invention. In FIG. 14A the components of a reel seat group 20 and handle interface are shown. The handle interface comprises a reel seat to proximal handle end interface 200, having a molded and/or cutout shaped for receiving the front retention flange extended from a reel. A distal end handle interface 202 is shown for retaining the opposite end of the handle and is shown with optional hook keeper 24. Handle interface 202 preferably protects the thin edge of the handle while preventing liquids from entering beneath the handle. A reel seat sleeve 206 is depicted having a circular exterior and an interior shape 208 for slidably engaging the rod section 12. It should be noted that interior shape 208 may be formed throughout reel seat sleeve, or be provided at the two ends of the reel seat sleeve, such as by way of plugs joined into the ends of the sleeve. An externally threaded section 210 is configured with exterior threads and an interior opening 212 having a shape suitable for joining to rod section 12, such as hexagonal according to the embodiment shown. A threadable reel retention element 214 is shown with an enlarged opening 216 for receiving a rear retention flange of a reel between the interior of opening 216 and the exterior of reel seat sleeve 206 as element 214 is threaded over threaded section 210. In this way the reel is securely retained by front and rear flanges extending from the reel. A butt end 218 is shown for capping the rear of the rod, reel seat and handle assembly. In a preferred embodiment butt end 218 is adapted with a transparent portion 220 (e.g., plastic, ground crystal, or glass formed in a piano or lens configuration) that allows the user to see through butt end 218 so that the unique spine construction at the end of the rod can be seen. The transparent portion of butt end 218 may be further configured with transparent colors, mother of pearl, particles (i.e., silver, gold, or platinum particles, and so forth), indicia, and so forth to provide any desired aesthetics at the end of the rod. In FIGS. 14B and 14C reel seat group 20 and handle 22 are shown assembled onto rod section 12 with hidden lines in FIG. 14B and in front view in FIG. 14C.

Typically, reel seat elements are fashioned from metals as this is very cost effective. Molded carbon fiber production according to the present invention can be cost effective as well. The tooling and materials are generally less expensive for molding composites. Moreover, it should be appreciated that metals do not provide the optimum strength-to-weight ratio, particularly when the reel seat must be of sufficient thickness to prevent unwanted deformation over the life of the rod, while the metals employed must not react to the environment (i.e., corrode) or to materials on the hands of the angler (i.e., often acidic biologic residues). In this present aspect of the invention, the reel seat group is formed at least partially from composite materials. In a preferred embodiment all the elements shown in FIG. 14A, except for the hook keeper, are formed from composite materials. A seamless reel seat 206 may be formed using linear interior fibers with an exterior seamless braided sock manufactured using a heated, bladder pressure, molding apparatus. It is filled or fitted around a low density material like cork, balsa wood, or Roacell foam not excluding hollow or other low density filler materials. Reel keepers 201 and 204 are molded and/or machined from carbon/graphite composites not excluding other linear fiber composite materials. Their fiber orientation are primarily in the bias or hoop direction.

Figure 15B:
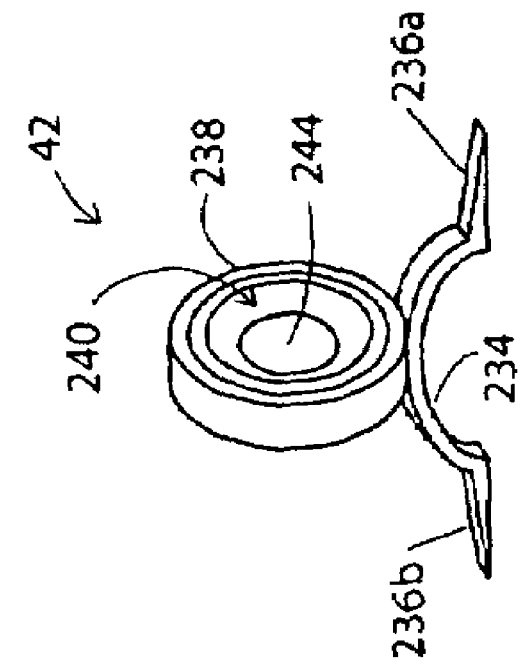
FIG. 15A-15B are side views of assembling a line guide according to an embodiment of the present invention.
Figure 15A:
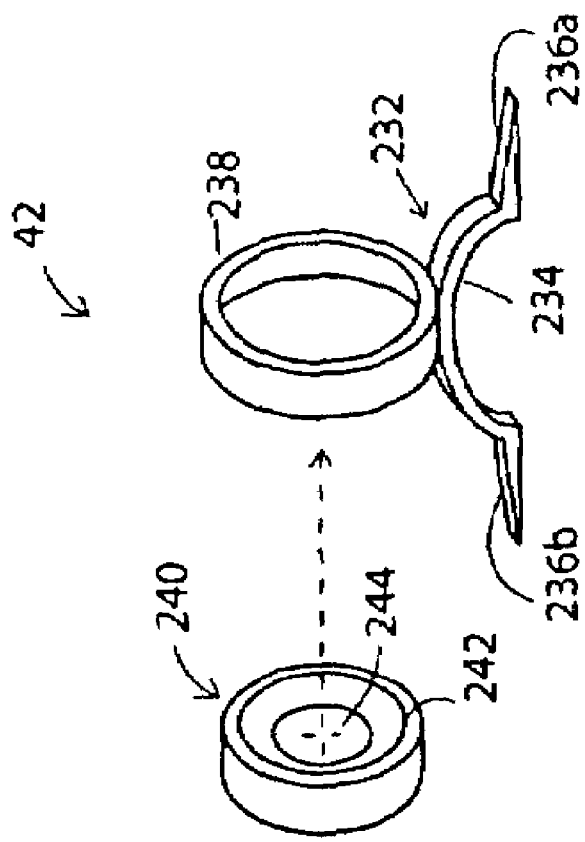

FIG. 15A-15B illustrates an example embodiment of a line guide 42 shown in FIG. 15A disassembled and in FIG. 15B in its assembled configuration. The benefits derived from the use of low friction line guides are particularly acute in fly rods, an optimum line guide having a very high hardness of its internal line bearing surface, being substantially impervious to wear and having a lightweight mounting which does not detract from the flexure characteristics of the rod itself. The line guide 42 according to this aspect of the invention is configured with a composite foot assembly 232 having a recessed and flexible bridge section 234 from whose ends extend first and second mounting flanges 236a, 236b. The bridge allows the line guide to flex in response to rod flexure wherein it does not detract from desired rod action. A guide retention ring 238 extends transversely from foot assembly 232, the two are preferably molded integral as one piece, such as molding one continuous fiber wrap to create the finished guide housing 42. A guide bearing 240 is depicted having an exterior 242 which surrounds a smooth aperture 244 having a cross section that strips the water from the line while exhibiting low friction and high wear resistance. In a preferred embodiment the guide is machined, or otherwise formed, from corundum or other very hard material. The use of ruby (corundum) or material of similar hardness provides a long wearing low friction interior bearing surface which is impervious to the environment. The line guide provides a number of advantageous features. The use of composite materials provides a line guide which is lighter than conventional metal line guides, while it has flexure characteristics and temperature coefficients which match that of the rod to which it is attached.

It will be appreciated that whenever materials having dissimilar temperature coefficients are bonded together that temperature cycling breaks down the strength of the bond over time, which can lead to failure. To overcome these effects large amounts of adhesive and more robust structures are often employed which both reduce flexure and increase weight. By way of example and not limitation, line guide 42 is bonded (e.g., using epoxy based adhesive, or other fastening means) between flanges 236a, 236b to the exterior of a given rod section, such as rod section 12 as shown in FIG. 1A. It should also be appreciated that the exterior of rod 12 may be adapted according to alternative embodiments, such as with recesses or apertures, or other structures adapted for receiving the foot assembly of line guide 42.

Figure 16B:
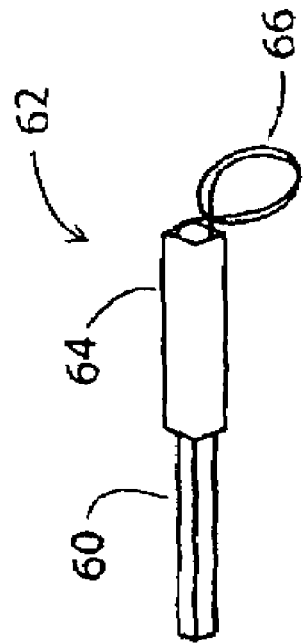
FIG. 16A-16B are side views of assembling a tip guide according to an embodiment of the present invention.
Figure 16A:
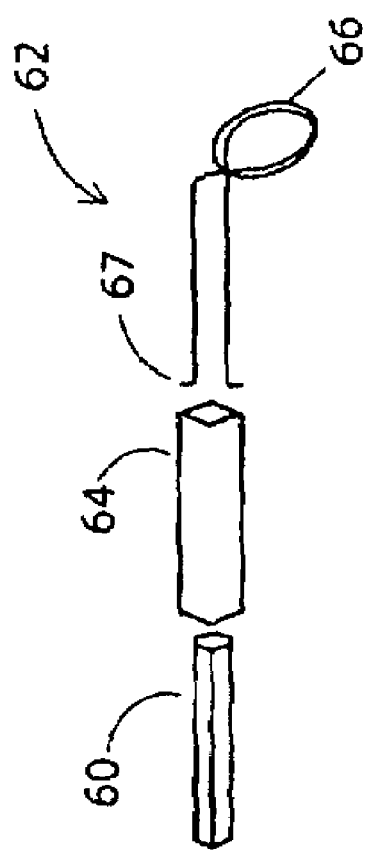

FIG. 16A-16B illustrate an example embodiment of a tip guide 62 shown in an exploded unassembled view in FIG. 16A and assembled in FIG. 16B. A top sleeve 64 is shown adapted with an interior shaped for receiving a rod section 60 from a first end and a line guide 66 from a second end (i.e., wire-formed or composite line guide). Preferably the tip guide 66 is formed from metal in a single, or more preferably two loops which after being preferably roughened on its bonding surfaces is adhered within sleeve 64 to rod section 60, for example with epoxy. Optionally, the exposed wire ends 67 of tip guide 66 may be bent so as to engage the sleeve once fully inserted through the sleeve, wherein the wire tip is unable to disengage from the tip once assembled on rod 60, even if the adhesive joining sleeve 64 to tip guide 66 and rod section 60 were subject to failure.

4.0 Methods of Manufacture.

Figure 17:
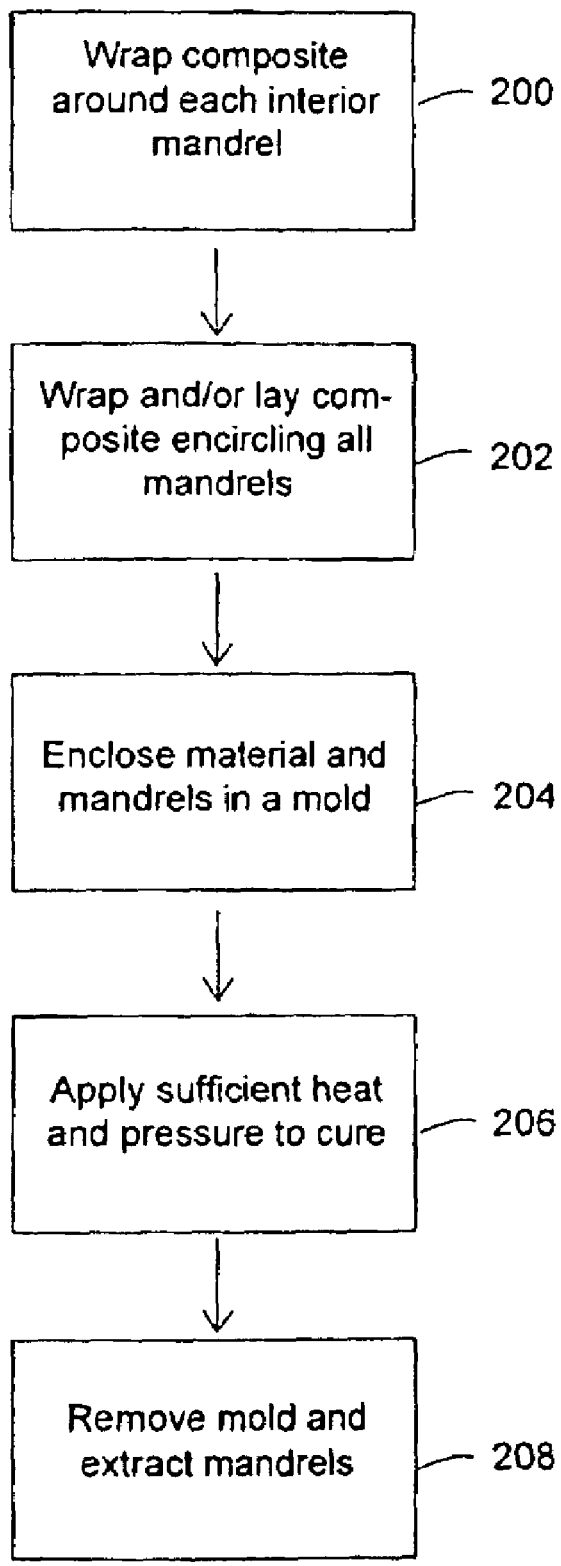
FIG. 17 is a flowchart of manufacturing integral single-piece rod sections according to an embodiment of the present invention.

FIG. 17 illustrates by way of example a process for forming a single piece rod section having an integral spine. In the following description the composite material used is preferably pre-impregnated ("pre-preg") with an appropriate resin. In one embodiment the fibers are carbon fiber composite material, although other materials may be utilized. It is preferred that most composite material have a higher tensile strength than conventional "fiberglass", although this is not necessary to practice the invention it is necessary in order to provide high strength to weight ratios preferred by serious sportsmen.

Sheets, or strips, of composite material are wrapped about a series of interior polygonal mandrels as represented by block 200, for example the mandrels may comprise six (6) tapering equilateral triangles (i.e., metal) to form a spine for a hexagonal rod according to the present invention. The pre-preg material thus surrounds each mandrel. Although the pre-preg material is preferably wrapped about each mandrel as one or more sheets, it can be wrapped between mandrel sections as well. Additional sheets, or strips, of composite material are laid on and wrapped up surrounding the group of covered polygonal mandrels as per block 202. The wrapped interior mandrels are then placed within a set of exterior mandrels, or mold, or pressure system, as per block 204. The interior of the mold is configured with the desired shape, such as hexagonal, and can be compressed toward the mandrels and pre-preg within its center to force out air and to fully force the resin and fibers into a homogeneous mass. As represented in block 206 sufficient heat and pressure are applied to the combination of mold, mandrels and composite material to cure the material. It should be recognized that this process does not limit the manufacture to single blanks at any one time, in fact, multiple rod sections can be formed simultaneously in complicated yet achievable autoclave manufacturing environments, including the use of metal and silicone and PTFE bladder pressure apparatus. The molds and mandrels are then removed from the fully formed rod section having integral spine. A solid tip section may be formed by first wrapping tightly linear fibers around each other and/or around fine non-removable preformed composite and/or metal material and/or by applying various length and width of composite materials to form a bundle. This bundle may be pre-infused or later infused with resin. This tapered conglomeration of materials is then compressed, stretched, and/or heated in an appropriate number of exterior mandrels or molds to facilitate the final polygonal solid cross section.

The rod section is then trimmed and any exterior surface enhancement is performed, such as dimpling, roughing, sanding, painting, adding optional inlays, for example as described in FIG. 4 or FIG. 5, and the preparation of the sections with ferrules, lines guides and the like toward creating the completed rod.

5.0 Alternative Embodiments.

Alternative embodiments of the invention are now described which can provide additional methods of fabrication, different benefits, features and so forth. Three additional processes are described in which the composite rod section with integral spine can be formed.

In a first alternative rod fabrication process, the solid mandrels that define the interior space are replaced with a flexible material which is more readily removed after the composite lay ups surrounding them are cured. For example, the mandrels may be replaced with a material that can be dissolved away in a solvent, water, or melted away by heating, for example a high density polyurethane material. Other alternatives, such as inflatable mandrels can be utilized, which simplify the removal process. It should be appreciated, however, that under heat and compression applied to cure the composite material, if the mandrel material is too soft it may deform and not be able to force the resins and composite cloth into a uniform solid without entrained air pockets or to maintain proper fiber orientation.

In a second alternative rod fabrication process the mandrels that define the interior spaces about which the pre-preg material is wrapped can be replaced with a lightweight material having the same shape as the mandrel. The use of a lightweight material instead of the mandrel eliminates the need to remove the mandrel after rod formation, thus simplifying and speeding manufacture. According to one implementation of this embodiment the mandrels are formed from a lightweight silicate material, such as Aerogel created from NASA research. Aerogel is the lightest and lowest-density solid known to exist, being typically up to 99.5% air, yet able to withstand (theoretically) 500 to 4,000 times its weight in applied force. This material or other lightweight foam materials, or graphite composite material, or the like, can be molded into non-removable mandrels, wherein the second portion of block 208 in FIG. 17 removal of the mandrels is unnecessary. Inclusion of a lightweight material for the mandrel can provide additional structural support and can discourage or prevent water from accumulating within the rod sections, in particular if a close cell material is utilized which water cannot penetrate. It should be appreciated, however, that with the closed nature of the rod sections water exclusion is not typically a large concern. According to another variation of this technique the mandrels may themselves be formed with a stiff material having a hollow center (e.g., carbon, aramid, ceramic fiber, and so forth), or alternatively have a high density stiff exterior with lower density interior material. The stiff exterior aids the mandrel in resisting compressive forces during mold compression and curing to assure a homogeneous lay up without voids.

In a third alternative rod fabrication process the mandrels and mold are replaced by a pull die and a pultrusion technique utilized, wherein the composite fibers are pulled through a heated die or series of dies. The composite material is either injected with resin or a fabric like tape is used in pre-preg style. However, forming an accurate taper and working with very small forming dies complicates the process.

6.0 Fishing Rod in Use.

Accordingly, it will be seen that this invention describes a fishing rod apparatus and method of manufacture of lightweight rods, which are suited for various sport fishing applications, and particularly well suited for use with fly rods. In addition, it should be appreciated that the techniques are generally applicable to forming of high strength-to-weight ratio polygonal sections for use in other applications which can benefit from this invention's enhanced spring dynamics.

It has been shown that the embodiment of this invention already surpasses current art on many levels. It is lighter than any fly rod currently being produced for the appropriate strength needed. It also exhibits new dynamic attributes not yet experienced by the sport fishing industry. The embodiment of this invention feels springier than conventional art. It is also truer and more accurate due to the intrinsic design without a discernible spline. Moreover, the embodiment of this invention gains rigidity the further it is flexed to a noticeable point of lock out well before catastrophic failure. When flexed the embodiment of this invention has a plurality of fibers equally in tension and compression compared to only the single fiber top and bottom of the circular cross section. Furthermore, the design has shown to be more durable than current art, comprising of a solid tip, and redundancy of materials at the apices of the polygonal cross section, and plurality of cells per cross section.

7.0 Scope of Example Embodiments.

The aspects, modes, embodiments, variations, and features described are considered beneficial to the embodiments described or select applications or uses; but are illustrative of the invention wherein they may be left off or substituted for without departing from the scope of the invention. Preferred elements of the invention may be referred to within the specification whose inclusion within specific design is optional, limited to specific applications or embodiment, or with respect to desired uses, results, cost factors and so forth which would be known to one practicing said invention or variations thereof. Moreover, a fishing rod (i.e., fly rod) according to the various embodiments of the present invention may be provided with all of features described herein, or only portions thereof, which combinations may be practiced and/or sold together or separately. For example, rod sections may be manufactured and sold without certain desired equipment for later assembly, such as for example reel seats, line guides, handle assembly and so forth. In this regard, aspects described within the present invention may be "adapted to" include or otherwise couple to such equipment without departing from the intended scope hereof.

It should be appreciated that each aspect of the invention may generally be practiced independently, or in combinations with elements described herein or elsewhere depending on the application and desired use. Modes of the invention may be utilized with the aspects described or similar aspects of this or other devices and/or methods. Embodiments exemplify the modes and aspects of the invention and may include any number of variations and features which may be practiced with the embodiment, separately or in various combinations with other embodiments.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A composite fishing rod, comprising:
    at least one elongate tapered section of a composite material having a polygonal exterior;
    a composite material spine within said tapered section;
    fibers in said composite material extending through all intersecting elongate planar sections which comprise said spine;
    fibers in said composite material surrounding said spine within said polygonal exterior;
    resin impregnating both the fibers of said spine and said polygonal exterior;
    wherein said fibers of said spine and said polygonal exterior comprise a single integral section in which fibers in said composite material cross over from each planar facet to adjacent planar facets and from each planar facet to each elongate planar section of said spine;
    said integral section is integrated by the presence of resin impregnated throughout the entire matrix of fibers which comprise said tapered section, bonding the fibers together in said spine and polygonal exterior into a single integral section as a uniform solid;
    at least one ferrule configured for connecting between multiple of said elongated tapered sections if said fishing rod includes more than one said elongated tapered section; and
    wherein said fishing rod is configured for attachment of a handle, reel seat, and line guides.

2. A composite fishing rod as recited in claim 1:
    further comprising attaching an inlay of at least one decorative and/or structural material to exterior portions of said polygonal exterior; and
    wherein said decorative and/or structural material can be selected from the group of material consisting essentially of: woods, bamboos, minerals, composites, metals, and textiles.

3. A composite fishing rod as recited in claim 2, further comprising a set of composite material ridges extending outwardly from between the facets of said polygonal exterior; and
    wherein the spaces between said composite material ridges can be inlayed with said decorative and/or structural material.

4. A composite fishing rod as recited in claim 1, wherein said composite material comprises a high tensile strength fiber material utilized with a resin system which joins the material fibers upon hardening.

5. A composite fishing rod as recited in claim 4, wherein said high tensile strength fiber material may be pre-impregnated with resin prior to being formed, or impregnated with resin at the time of forming.

6. A composite fishing rod as recited in claim 5, wherein said composite material comprises a carbon graphite pre-impregnated fiber lay-up.

7. A composite fishing rod as recited in claim 1, wherein said fishing rod comprises a fly fishing rod having at least two elongated tapered sections configured for interconnection with ferrules.

8. A composite fishing rod, comprising:
   at least one elongate tapered section of a composite material having a polygonal exterior
   a composite material spine within said tapered section joined between opposing joints or facets of said polygonal exterior;
   fibers in said composite material extending through all intersecting elongate planar sections which comprise said spine;
   fibers in said composite material surrounding said spine within said polygonal exterior;
   resin impregnating both the fibers of said spine and said polygonal exterior wherein the spine and exterior facets comprise a single integral structure;
   wherein said fibers of said spine and said polygonal exterior comprise a single integral section in which fibers in said composite material cross over from each exterior facet to adjacent exterior facets and from each exterior facet to each elongate planar section of said spine;
   said integral section is integrated by the presence of resin retained throughout the entire matrix of fibers which comprise said tapered section, bonding the fibers together in said spine and polygonal exterior into a single integral section as a uniform solid;
   a plurality of line guides;
   a handle coupled to a first end of one elongate tapered section, said first end of said tapered sections having a diameter which exceeds that of the opposing, second, end of said elongate tapered section or other sections to be joined thereto in forming said fishing rod;
   a reel seat configured for attachment adjacent said handle; and
   means for selectable retaining a reel upon said reel seat.

9. A composite fishing rod as recited in claim 8, wherein said fishing rod comprises:
   at least two elongate tapered sections, including at least a first and second elongate tapered section; and
   at least one ferrule configured for removably joining said first and second elongate tapered sections.

10. A composite fishing rod as recited in claim 9, wherein said ferrule comprises:
    a female ferrule end having a tapered recess in an end of a first said elongate tapered section into which a first tapered receiving sleeve is joined; and
    a male ferrule end on a second said elongate tapered section having a tapered protruding portion of the integral spine over which a second tapered protruding sleeve is joined;
    wherein said first and second tapered sleeves are configured for slidable engagement with one another.

11. A composite fishing rod as recited in claim 8, wherein said composite material comprises a high tensile strength fiber material utilized with a resin system which joins the material fibers upon hardening.

12. A composite fishing rod as recited in claim 11, wherein said composite material comprises a carbon graphite fiber lay-up.

13. A composite fishing rod as recited in claim 8, wherein at least one of said line guides comprises:
    a circular ring of material providing a low friction interface with fishing line and a sufficient hardness to provide durability;
    a guide housing into which said circular ring of material is retained;
    a loop of composite material for receiving said circular ring of material within said guide housing; and
    a composite material foot assembly upon said housing joined contiguous to said composite loop and having first and second projective means extending from a flexible bridge element;
    wherein said first and second projective means are configured for being attached to said rod section.

14. A composite fishing rod as recited in claim 13, wherein said circular ring of material is selected from the group of materials consisting essentially of ceramic, glass, and minerals.

15. A composite fishing rod as recited in claim 13, wherein said circular ring of material comprises a ruby and corundum material.

16. A composite fishing rod as recited in claim 8, wherein said reel seat and means for selectable retaining a reel upon said reel seat, comprises:
    a reel seat to proximal handle end interface configured for attachment to said rod section proximal said handle and having a cutout shaped for receiving a front retention flange of a reel;
    a reel seat sleeve having an exterior configured for mounting a reel;
    an externally threaded section configured with exterior threads and an interior opening adapted for attachment to said rod section;
    a threadable reel retention element having an opening configured for receiving a rear retention flange of a reel between the interior of opening and the exterior of said reel seat sleeve; and
    wherein the elements of said reel seat are made of a composite material.

17. A composite fishing rod as recited in claim 8, wherein said composite material spine comprises a plurality of intersecting elongate planar sections whose ends attach at the joints between facets of said polygonal exterior.

18. A composite fishing rod as recited in claim 8, wherein the space between said polygonal exterior and said spine is either unfilled, or filled with a lightweight material.

* * * * *